United States Patent Office 3,167,550
Patented Jan. 26, 1965

3,167,550
DERIVATIVES OF 7-AMINOCEPHALOSPORANIC ACID
Alfred W. Chow, Merchantville, N.J., and John R. E. Hoover, Glenside, Pa., assignors to Smith Kline & French Laboratories, Philadelphia, Pa., a corporation of Pennsylvania
No Drawing. Filed Nov. 13, 1962, Ser. No. 237,384
10 Claims. (Cl. 260—243)

This application is a continuation-in-part of our co-pending application, Serial No. 85,962, filed January 31, 1961, now abandoned.

The invention described herein pertains to novel organic compounds possessing valuable chemotherapeutic activity and more specifically to a new class of antimicrobial agents.

In general, the compounds of our invention demonstrate a high level of antimicrobial activity against such organisms as penicillin resistant *Staphylococcus aureus*, *Diplococcus pneumoniae*, and *Proteus vulgaris*, and furthermore, manifest certain other advantageous properties such as prolonged stability and a surprisingly low incidence of side effects. They are accordingly useful in the treatment of various antimicrobial infections and may be administered to the infected host in any of the usual forms, such as for example, solutions, suspensions, creams, ointments, tablets, capsules and the like as well as being suitable for oral, injectable or topical application, depending upon the nature of the particular infection. Certain of our compounds are also useful as feed additives for livestock.

The structure of our novel compounds may be represented by the following formula:

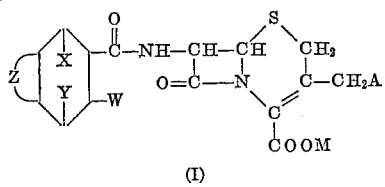

(I)

wherein A is hydrogen, hydroxyl, lower alkanoyloxy, benzoyloxy, pyridinium, or, when taken together with M, a monovalent carbon-oxygen bond; M is hydrogen, a pharmaceutically acceptable cation, an anionic charge when A is pyridinium, or, when taken together with A, a monovalent carbon-oxygen bond; Z is (H, H), or a carbon-carbon bond; W is hydrogen, lower alkyl or phenyl; X is hydrogen, lower alkyl, phenyl, or, when taken with group Y, methylene and 2-propylidene; Y is hydrogen, or, when taken together with X, methylene and 2-propylidene.

By the terms lower alkyl or lower alkanoyloxy is meant a group embracing a branched or straight chained hydrocarbon group of from 1 to 6 carbon atoms.

In those instances where A is pyridinium, the cationic charge on this group is matched by the anionic charge of the carboxylic acid radical, the entire molecule being of a Zwitterionic nature. The symbol A also represents hydroxyl or the lower alkanoic acid esters of from 1 to 6 carbon atoms and benzoic acid esters thereof. The hydroxyl group thus embraced by A may also be internally esterified by the carboxylic acid radical of the isovaleric acid carbon-oxygen skeleton thereby forming a lactone ring as represented when A and M taken together comprise a monovalent carbon-oxygen bond.

Also embraced by the present invention are the salts of the above compounds. Thus in addition to those compounds wherein M is hydrogen are those wherein this atom is replaced by the cationic form of sodium, potassium, calcium, aluminum, or organic amines such as lower alkyl amine, e.g., triethylamine, as well as procaine, chloroprocaine, N,N'-dibenzylethylenediamine, N, N' - bis-(dehydroabietyl)-ethylenediamine, N-methyl-1, 2-diphenyl-2-hydroxyethylamine, and the like.

The compounds of our invention are thus cyclohexane carboxylic acid derivatives and bicyclo-[2.2.1]-cycloheptane carboxylic acid derivatives of certain heterocyclic nuclei and are prepared by treating a compound of the formula:

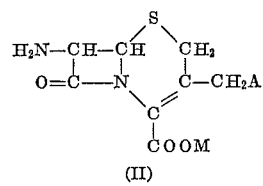

(II)

wherein R is as heretofore described, with a mixed anhydride or acid chloride of the appropriate cyclohexane or bicyclo - [2.2.1]-cycloheptane carboxylic acid. In the case of employing the mixed anhydride this compound is obtained by treating the appropriate acid with a lower alkyl chloroformate, such as for example, ethylchloroformate.

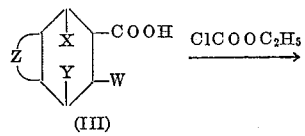

(III)

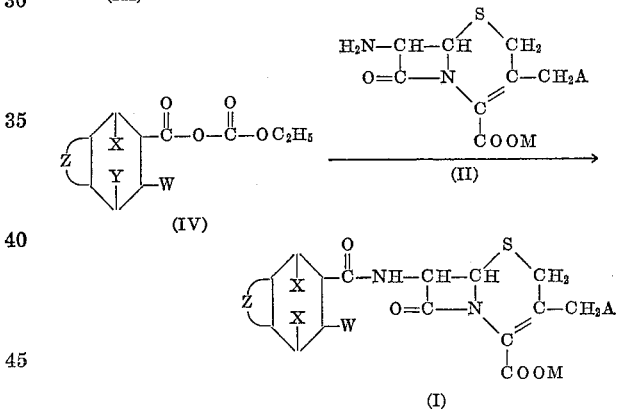

Preferably the acid chlorides of the above acids embraced by Formula III are reacted with the heterocyclic nuclei represented by Formula II to yield the desired products embraced by Formula I.

We have found that the structures represented by Formula I demonstrate the property of improved enzyme resistance without appreciably affecting the antimicrobial activity of the final product. This property of improved enzyme resistance manifests itself through activity against certain strains of microorganisms which heretofore have been resistant to most known penicillins, presumably because of their ability to secrete the enzyme penicillinase. The cycloalkane moiety of our novel compounds have the carbon skeleton of a monocyclic cyclohexane or a cyclohexane bridged by a methylene or substituted methylene radical. These latter moieties are thus bicyclo-[2.2.1]-cycloheptanes or norboranes as named according to the American Chemical Society "Nomenclature for Terpene Hydrocarbons," Report 14 (March 1955). Also embraced by our invention are the monounsaturated analogs of the foregoing wherein a double bond is present in the γ position to the carboxylic acid (or between the 3 and 4 position of the cyclohexane ring numbering from the carbon atom to which the carboxylic acid is attached). There may be additional substitution present in the cyclohexane ring (or cyclohexene ring) in either of the positions adjacent to the carboxylic acid moiety, namely position 2 or 6, with the limitation that there is no substitution in position 2 when said position is bridged with position 5 via a methylene or 2-propylidene group.

Particularly advantageous embodiments of our invention are those compounds wherein Z represents a carbon-carbon bond, X represents phenyl and W and Y represent hydrogen.

The bicyclo and cycloalkane moieties embraced by our invention can exist in several stereoisomeric configurations. Thus for example, the carboxyamido group may lie exo or endo with respect to the methylene bridge group of the norbornane ring system. Similarly the group W may lie exo or endo to the norbornane ring system. The cyclohexane and cyclohexene derivatives of the present invention embrace both the cis and trans isomers when such are possible. These various isomers are preferably prepared by isolation and use of the appropriate isomer of acid represented by Formula III. These various isomeric forms discussed above demonstrate antimicrobial activity and all such forms are envisioned as being within the scope of the instant invention and are embraced in the structural formulas represented herein and in the appended claims.

Several of requisite norbornene carboxylic acids employed in our invention are known and available to the art. Others may be prepared according to a standard Diels-Alder condensation employing the appropriately substituted dienophile and 1,3-cyclopentadiene or 5,5-dimethyl-1,3-cyclopentadiene. This procedure is also applicable for the preparation of the various cyclohex-3-ene carboxylic acids by substituting a 1,3-butadiene for 1,3-cyclopentadiene.

The starting materials whose structures are represented by Formula II include for example, 7-aminocephalosporanic acid and certain related derivatives of 7-aminocephalosporanic acid. This heterocyclic compound, 7-aminocephalosporanic acid, can be prepared from the antibiotic substance Cephalosporin C whose physical and antimicrobial properties are known to the art and whose structure is represented by the structural formula:

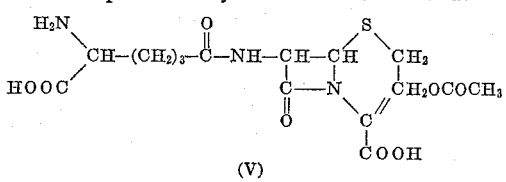

(V)

Upon hydrolysis of Cephalosporin C, as for example, acid hydrolysis, there is formed α-aminoadipic acid and 7-aminocephalosporanic acid whose structure may be represented by the formula:

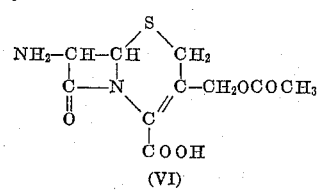

(VI)

In addition to the formation of 7-aminocephalosporanic acid upon the acid hydrolysis of Cephalosporin C, there is also further formed by hydrolysis of the acetoxy grouping and subsequent internal esterification, the lactone having the formula:

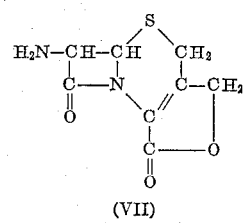

(VII)

These two products designated by Formula VI and Formula VII are readily separated by virtue of the different physical properties, as for example, by chromatographic technique.

We have found it further possible to modify the structure of 7-aminocephalosporanic acid by enzymatic cleavage of the acetoxy grouping without subsequent lactone formations. There is thus formed the compound 3-hydroxymethyl-7-aminodecephalosporanic acid represented by the formula:

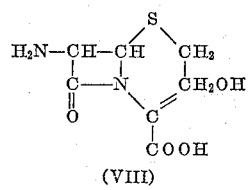

(VIII)

The designation decephalosporanic acid is herein employed for purposes of nomenclature only and intended to represent the basic heterocyclic acid nucleus having the formula:

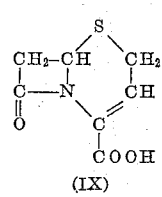

(IX)

This cleavage of the acetoxy grouping to form 3-hydroxymethyl-7-aminodecephalosporanic acid without subsequent lactone formations may be accomplished by employing enzymatic means, as for example, by the action of an acetylesterase. Such suitable enzyme preparations may be obtained for example, from citrus fruits such as oranges, grapefruit, lemons nad the like, as described by Jansen et al., Arch. Biochem, 15, 415 (1947). Preparations of such an enzyme advantageously effect hydrolysis of the acetoxy side chain without subsequent lactone formation. The resultant hydroxy group may then be further modified as by re-esterification with a lower alkanoic acid radical so as to form the lower alkanoate esters homologous to the acetate ester present in the naturally occurring Cephalosporin C.

As the conditions and reagents employed in acylating hydroxy groups are similar to those for acylating amino groups, it is generally desirable in practice to effect acylation of the hydroxymethyl group in the 3 position of decephalosporanic acid, after formation of the carboxyamido group in the 7 position. Deacetylation on either Cephalosporin C or 7-aminocephalosporanic acid according to the enzymatic techniques discussed herein followed by reacylation of the resultant hydroxyl group generally results in concurrent acylation of the amino group of the α-amino side chain adipic acid of Cephalosporin C or of the amino group in the 7 position of 7-aminocephalosporanic acid respectively. Thus in practice, Cephalosporin C is cleaved by acid hydrolysis as herein described to yield 7-aminocephalosporanic acid which in turn is subjected to the procedures of this invention to obtain the 7-carboxyamido derivative of cephalosporanic acid. This compound may then be treated with acetylesterase as herein described to yield the corresponding compound containing a hydroxymethyl group in the 3 position which in turn in reacylated by methods analogous to those known to the art, such as for example, by means of an acyl halide or acid anhydride.

Treatment of Cephalosporin C with a tertiary base such as for example, pyridine (including the substituted derivatives thereof such as 2,6-dimethylpyridine), quinoline, or collidine prior to acid hydrolytic cleavage of the aminoadipic acid side chain forms as quaternary salt derivative of Cephalosporin C which when hydrolyzed yields a nucleus which, in the case of pyridine, has been assigned the name, 3-pyridiniummethyl-7-aminodecephalosporanic acid inner salt and the structure:

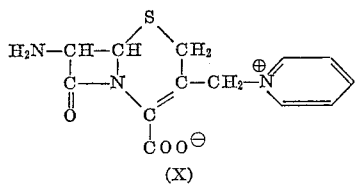

(X)

Catalytic hydrogenation of 7-aminocephalosporanic acid or of Cephalosporin C followed by hydrolysis yields the nucleus 3-methyl-7-aminodecephalosporanic acid which is thereafter acylated with the cycloaliphatic carboxylic acid derivatives as herein described to yield additional compounds of this invention.

The nature of our invention is further typified by the following examples; however these examples should not in any way be construed as limiting the scope of our invention.

Example 1

Four grams of Cephalosporin C as the sodium salt are dissolved in 60 ml. of water and the pH adjusted to 2.5 by the addition of the acid form of Dowex 50 (x8). The resin is filtered and washed with 20 ml. of water and to the combined filtrate and washings are added 20.5 ml. of 0.1 N hydrochloric acid. The mixture is allowed to stand for 72 hours at 20° C. and at the end of this time, introduced into a column of Dowex-1 (as the acetate form), 2 cm. x 10 cm. The initial percolate is collected in 10 ml. fractions and upon the collection of the twelfth fraction the column is eluted with water until a total of 34 fractions have been collected. The column is thereupon eluted with 0.5 N acetic acid and an additional 65 fractions collected.

Fractions of 36 through 45 are combined and concentrated by freeze drying to yield 7-aminocephalosporanic acid.

Fractions 2 through 16 are combined and concentrated in vacuo to yield the lactone of desacetyl Cephalosporin C which when resubjected to the above acid hydrolysis procedure yields 3-hydroxymethyl-7-aminodecephalosporanic acid lactone.

By increasing the concentration of the acid in the above procedure from 0.1 N to 1.0 N and the length of reaction to four days the amounts of desacetyl Cephalosporin C lactone and 3-hydroxymethyl-7-aminocephalosporanic acid lactone are increased.

Example 2

A. One gram of Cephalosporin C as the sodium salt is dissolved in 50 ml. of water. There is then added sufficient Dowex 50 (x8) resin as the hydrogen form to adjust the pH to 2.6. The resin is removed by filtration and to the filtrate is added 3.8 ml. of pyridine, the pH rising to approximately 6.5. The solution is maintained in a glass container at 37° C. for 48 hours. At the end of this time the solution is freeze dried and the residue, triturated twice with 50 ml. of acetone and redried. The solid is then dissolved in 10 ml. of water and introduced onto a Dowex 1 (x10) acetate column (2 cm. x 10 cm.). The column is eluted with water and 10 ml. fractions are collected. Fractions 2 through 4 are then combined and freeze dried, and the residue stirred with acetone and dried to yield the pyridinium inner salt of desacetyl Cephalosporin C.

B. This material is then subjected to the acidic hydrolytic procedure as described in Example 1. Upon chromatographic separation as described therein, the earlier fractions collected are combined and reduced to a residue to yield 3-pyridiniummethyl-7-aminodecephalosporanic acid inner salt. The latter fractions are combined and concentrated to a residue to yield the pyridinium inner salt of desacetyl Cephalosporin C which may be resubjected to the hydrolytic procedure to yield additional material.

Example 3

A. To 350 ml. of a three molar ethereal solution of methylmagnesium bromide is added an additional 150 ml. of anhydrous ether and the mixture cooled below 10°. There is then added with stirring a solution of 132.2 g. (0.1 mole) of redistilled cinnamaldehyde in 120 ml. of anhydrous ether. The rate of addition is adjusted so that the temperature is maintained below 10° and a stream of nitrogen is passed through the reaction vessel. When the addition is complete (approximately 1.5 hours), the reaction mixture is removed and added over a 10 minute period without cooling but with agitation to 350 ml. of 30% sulfuric acid. The resultant mixture is heated at reflux for an additional 10 minutes and the layers then cooled and separated. The ethereal portion is washed successively with water, 5% aqueuos sodium hydroxide solution, saturated aqueous ammonium chloride solution, and finally with water. The washed solution is dried over magnesium sulfate and the solvent evaporated on a steam bath. Distillation in vacuo of the residual oil yields 1-phenyl-1,3-butadiene.

B. To 59.6 g. (0.46 mole) of 1-phenyl-1,3-butadiene is added 1 g. of hydroquinone and 36 g. (0.05 mole) of freshly distilled acrylic acid. The mixture is allowed to stand at room temperature for 30 days and at the end of this time the mixture is filtered. The solid thus collected is slurried in hexane, refiltered and dried in vacuo to yield 2-phenylcyclohex-3-ene carboxylic acid.

Example 4

A solution of 7.0 g. (0.035 mole) of 2-phenylcyclohex-3-ene carboxylic acid and 25 ml. of thionyl chloride is allowed to stand at room temperature for 15 hours. The excess thionyl chloride is removed under reduced pressure and the resultant solid washed with cold heptane and dried to yield 2-phenylcyclohex-3-ene carboxylic acid chloride.

2-phenylcyclohex-3-ene carboxylic acid chloride (7.75 g.) in 35 ml. of acetone is added with stirring to a solution of 4.08 g. (0.015 mole) of 7-aminocephalosporanic acid in 200 ml. of 3% aqueous sodium bicarbonate solution and 120 ml. of acetone. The mixture is stirred for one-half hour and then extracted with 3 portions of 150 ml. of ether. The residual aqueous phase is cooled to 5° C. and adjusted to pH 2.5 by the addition of dilute hydrochloric acid. The solution is then extracted three times with butyl acetate. These extracts are washed with water and then 40 ml. of water are added and the pH adjusted to 8.0 by the addition with agitation of solid potassium bicarbonate. The aqueous layer is separated, filtered and adjusted to pH 2.0 by the addition of concentrated sulfuric acid at a temperature below 10°. The resultant acidic aqueous mixture is extracted twice with butyl acetate and these extracts are washed with water and dried over sodium sulfate. The dried solution is added with vigorous stirring to a solution of potassium hydroxide in n-butanol (40 g./l.) until the pH is 8.4. The mixture is cooled until crystallization occurs and the crystals so formed are collected by centrifugation, washed with a small amount of acetone and dried. The dried crystals are dissolved in a minimum quantity of acetone: water (9:1) and precipitated by the addition of anhydrous ether. These crystals are collected and dried to yield 7-(2-phenylcyclohex-3-enylcarboxyamido)-cephalosporanic acid as the potassium salt. Treatment of an aqueous solution of this potassium salt with hydrogen chloride and extraction with ether then yields the free acid 7-(2-phenylcyclohex-3-enylcarboxyamido)-cephalosporanic acid.

Example 5

By employing 31.3 g. of 1,3-pentadiene in Part B of Example 3, there is obtained the compound 2-methylcyclohex-3-ene carboxylic acid which is employed in the procedure of Example 4 to yield 7-(2-methylcyclohex-3-enylcarboxyamido)-cephalosporanic acid. Similarly by employing 1,3-hexadiene and 6-methyl-1,3-hexadiene in Part B of Example 3, there are obtained the intermediates 2-ethylcyclohex-3-ene carboxylic acid and 2-isopropyl-hex-3-ene carboxylic acid, which when subjected to the procedure of Example 4 yields the compounds 7-(2-ethyl-cyclohex-3-enylcarboxyamido)-cephalosporanic acid and 7 - (2 - isopropylcyclohex-3-enylcarboxyamido)-cephalosporanic acid.

*Example 6*

A mixture of 45.3 g. (0.233 mole) of 2-phenylcyclohex-3-ene carboxylic acid and 500 mg. of platinum oxide in 150 ml. of ethyl acetate is treated with hydrogen at an initial pressure of 50 p.s.i. with sufficient heat to dissolve the acid. Upon the uptake of the theoretical amount of hydrogen, the container is removed from the hydrogenation apparatus and the mixture filtered. Concentration of the filtrate under reduced pressure then yields a solid which is triturated with 200 ml. of hexane, refiltered and dried to yield 2-phenylcyclohexane carboxylic acid.

2-phenylcyclohexane carboxylic acid is employed in the procedure of Example 4 to yield 7-(2-phenylcyclohexanyl-carboxyamido)-cephalosporanic acid.

Likewise the following compounds are subjected to the procedure of this example: 2-methylcyclohex-3-enecarboxylic acid, 2-ethylcyclohex-3-ene carboxylic acid, 2-isopropylcyclohex-3-ene carboxylic acid. There are thus obtained upon the steps therein described the compound 2-methylcyclohexane carboxylic acid, 2-ethylcyclohexane carboxylic acid and 2-isopropylcyclohexane carboxylic acid. By employing these 2-substituted cyclohexane carboxylic acids in the procedure of Example 4, there are similarly obtained the following compounds: 7-(2-methyl-cyclohexanylcarboxyamido)-cephalosporanic acid, 7-(2-ethylcyclohexanylcarboxyamido) - cephalosporanic acid and 7 - (2-isopropylcyclohexanylcarboxyamido)-cephalosporanic acid.

*Example 7*

To 24.8 g. (0.46 mole) of 1,3-butadiene is added 7.5 g. (0.05 mole) freshly distilled cinnamic acid in 200 ml. of anhydrous toluene and the mixture heated at reflux for 40 hours. The solution is then cooled and the mixture extracted with 5% sodium bicarbonate. These aqueous extracts are in turn washed with ether and acidified by the addition of hydrochloric acid. The solid which thus forms is collected by filtration and dried to yield 6-phenylcyclohex-3-ene carboxylic acid.

By substituting 4.3 g. of methyl acrylic acid and 6.9 g. of 2-hexenoic acid for acrylic acid for cinnamic acid in the above procedure, there are thus obtained the compounds 6-methylcyclohex-3-ene carboxylic acid and 6-propylcyclohex-3-ene carboxylic acid.

By employing equivalent amounts of 6-phenyl-cyclohex-3-ene carboxylic acid, 6-methylcyclohex-3-ene carboxylic acid and 6-propylcyclohex-3-ene carboxylic acid in the procedure of Example 4, there are respectively obtained the compounds: 7 - (6-phenylcyclohex-3-enyl-carboxyamido)-cephalosporanic acid, 7-(6-methylcyclohex-3-enyl-carboxyamido)-cephalosporanic acid and 7-(6-propylcyclohex-3-enylcarboxyamido)-cephalosporanic acid.

*Example 8*

A solution of 8 g. of 3-phenyl-5-norbornene 2-carboxylic acid and 25 ml. of thionyl chloride is allowed to stand at room temperature for 15 hours. The excess reagent is then removed and the solid collected by filtration and washed with a small amount of cool heptane to yield 3-phenyl-5-norbornene 2-carboxylic acid chloride.

To a stirred solution of 5.44 g. (0.02 mole) of 7-aminocephalosporanic acid in 230 ml. of 3% aqueous sodium bicarbonate solution and 150 ml. of acetone is added in a dropwise fashion over a 15 minute period a solution of 6.3 g. (0.02 mole) of 3-phenyl-5-norbornene 2-carboxyl chloride in 50 ml. of acetone. The mixture is then stirred for one hour and extracted three times with ether. The aqueous phase is cooled to 5°, adjusted to pH 2.5 and extracted with methylisobutyl ketone. These extracts are washed with water, 40 ml. of water are added and the pH adjusted to 8.0 by addition with stirring of solid potassium bicarbonate. The aqueous layer is separated, filtered and adjusted to pH 2.0 by the addition at 80° C. of concentrated sulfuric acid. This acidic aqueous phase is then extracted twice with butyl acetate and these extracts washed with water and dried over sodium sulfate. The dried solution is added with vigorous stirring to a solution of potassium hydroxide in n-butanol (40 g./l.) until a pH of 8.4 is attained. The mixture is cooled until crystallization occurs and the solid so formed collected by filtration, washed with acetone, dried, and recrystallized from a minimal amount of acetone: water (9:1) with precipitation being effected by the addition of anhydrous ether. Collection of the crystals then yields 7-(3-phenyl-5-norbornen-2-ylcarboxyamido)-cephalosporanic acid as the potassium salt which may be converted to the corresponding free acid by treatment with acid.

5-norbornene-2-carboxylic acid (5.1 g.) is employed in the procedure of this example and upon execution of the steps herein described employing equivalent amounts of the bicyclo compounds, there is obtained the compound 7-(5-norbornen-2-ylcarboxyamido)-cephalosporanic acid.

In a similar fashion by employing 3-methyl-5-norbornene-2-carboxylic acid, 3-methylnorbornane 2-carboxylic acid, 3-ethylnorbornane 2-carboxylic acid, 3-phenylnorbornane 2-carboxylic acid and norbornane 2-carboxylic acid in the procedure of the instant example, there are obtained the following compounds: 7-(3-methyl-5-norbornen-2-ylcarboxyamido)-cephalosporanic acid, 7-(3-methylnorbornan - 2 - ylcarboxyamido)-cephalosporanic acid, 7 - (3-ethylnorbornan-2-ylcarboxyamido)-cephalosporanic acid, 7-(3-phenylnorbornan-2-yl-carboxyamido)-cephalosporanic acid, and 7-(norbornan-2-ylcarboxyamido)-cephalosporanic acid.

*Example 9*

7,7-dimethyl-5-norbornene 2-carboxylic acid is substituted for 3-phenyl-5-norbornene 2-carboxylic acid in the procedure of Example 8. Upon execution of the steps therein described employing equivalent amounts of the norbornene compounds, there is obtained 7-(7,7-dimethyl-5-norbornen-2-ylcarboxyamido)-cephalosporanic acid.

3-phenyl-7,7-dimethyl-5-norbornene 2-carboxylic acid obtained from 5,5-dimethyl-1,4-cyclopentadiene and cinnamic acid is converted to its acid chloride and thence allowed to react with 7-aminocephalosporanic acid as herein described to yield 6-(3-phenyl-7,7-dimethylnorbornen-2-ylcarboxyamido)-cephalosporanic acid.

*Example 10*

3-hydroxymethyl-7-aminodecephalosporanic acid lactone is substituted in equivalent amounts for 7-aminocephalosporanic acid and is allowed to react with 2-phenyl cyclohex-3-ene carboxylic acid chloride according to the initial procedure of Example 4. The reaction mixture is then extracted with butyl acetate and these organic extracts then concentrated to a residue comprising 3-hydroxymethyl - 7 - (2-phenylcyclohex-3-enyl-carboxyamido)-decephalosporanic acid lactone which is further purified by recrystallization from ether.

In a similar manner the other cyclohexene, cyclohexane, norbornene, and norbornane carboxylic acid chlorides herein described are allowed to react with 3-hydroxymethyl-7-aminodecephalosporanic acid lactone to yield the corresponding 7-carboxyamido derivatives of 3-hydroxymethyldecephalosporanic acid lactone. For example, from 2-phenylcyclohexane carboxylic acid there is obtained the compound 7-(2-phenylcyclohexanyl-carboxyamido)-cephalosporanic acid.

Example 11

An equivalent amount of 3-pyridiniummethyl-7-aminodecephalosporanic acid inner salt is employed in the place of 7-aminocephalosporanic acid in the procedure of Example 4 and there is thus obtained upon completion of the steps therein described the compound 3-pyridiniummethyl - 7 - (2-phenylcyclohex-3-enylcarboxyamido) - decephalosporanic acid inner salt.

Alternatively 7 - (2-phenylcyclohex - 3 - enylcarboxyamido)-cephalosporanic acid (1 g.) as the sodium salt is dissolved in 50 ml. of water and to the solution is added sufficient Dowex 50 (x8) resin (as the hydrogen form) to bring the pH to 2.6. The resin is removed by filtration and to the filtrate is added 4 ml. of pyridine. The solution is maintained in a glass container at 37° C. for 48 hours and then freeze dried. The residue is triturated twice with 50 ml. of acetone, redried, and dissolved in water. This solution is then introduced onto a Dowex 1 (x10) acetate column and eluted with water. The initial fractions are collected and freeze dried to yield 3-pyridiniummethyl-7-(2-phenylcyclohex-3-enylcarboxyamido) - decephalosporanic acid inner salt.

Similarly from 7-(2-phenylcyclohexanylcarboxyamido)-cephalosporanic acid there is obtained according to this process, 3-pyridiniummethyl-7-(2-phenylcyclohexanylcarboxyamido)-decephalosporanic acid inner salt.

Example 12

A preparation of acetylesterase obtained from the peels of 72 oranges according to the procedure of Jansen et al., Arch. Biochem., 15, 415 (1947), is added to 1 g. of 7-(2-phenylcyclohex - 3 - enylcarboxyamido)-cephalosporanic acid dissolved in 15 ml. of water. The pH 1 is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7-(2-phenylcyclohex-3-enylcarboxyamido)-decephalosporanic acid as the sodium salt.

To 1 g. of 3-hydroxymethyl-7-(2-phenylcyclohex-3-enylcarboxyamido)-decephalosporanic acid in 10 ml. of collidine are added 15 ml. of propionyl chloride. The mixture is allowed to stand for 10 hours and at the end of this time poured into 25 ml. of ice water. The solid which is thus formed is collected by filtration, recrystallized from dimethylformamide and dried to yield 3-propionyloxymethyl - 7 - (2 - phenylcyclohex - 3 - enylcarboxyamido)-decephalosporanic acid. In a similar fashion other lower alkanoyl chlorides such as butanoyl chloride or pentanoyl chloride may be employed in place of propionyl chloride obtaining the corresponding compounds 3-butanoyloxy - 7 - (2-phenylcyclohex - 3 - enylcarboxyamido)-decephalosporanic acid and 3-pentanoyloxymethyl-7-(2-phenylcyclohex - 3 - enylcarboxyamido)-decephalosporanic acid.

In an analogous fashion benzoyl chloride is employed in the place of these lower alkanoyl chlorides and it is thus obtained 3-benzoyloxymethyl-7-(2-phenylcyclohex-3-enylcarboxyamido)-decephalosporanic acid.

By substituting 7-(2-phenylcyclohexanylcarboxyamido)-cephalosporanic acid, 7-(6-phenylcyclohex-3-enylcarboxyamido)-cephalosporanic acid and 7-(3-phenyl-5-norbornen-2-ylcarboxyamido)-cephalosporanic acid in the above procedure, there are respectively obtained upon subjection to the procedure of the present example the compounds, 3-propionyloxymethyl-7-(2-phenylcyclohexanyl-
carboxyamido)-decephalosporanic acid,
3-propionyloxymethyl-7-(6-phenylcyclohex-3-enyl-
carboxyamido)-decephalosporanic acid, and
3-propionyloxymethyl-7-(3-phenyl-5-norbornen-2-
ylcarboxyamido)-decephalosporanic acid.

In a similar manner by employing benzoyl chloride the corresponding benzoate esters of the above compounds are prepared.

Example 13

Cephalosporin C sodium salt dihydrate (0.75 g.) in sufficient water to effect dissolution is added to an aqueous suspension of 2.0 g. of 10% palladium on carbon in 30 ml. of water which has been previously saturated with hydrogen. The mixture is hydrogenated with agitation at one atmosphere pressure for 1 hour.

The catalyst is removed by centrifugation and the supernatant is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield the product as the sodium salt.

The product obtained (0.3 g.) is dissolved in 7 ml. of water containing 0.25 g. of anhydrous sodium bicarbonate. To this stirred solution is added 0.25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2,4-dinitrobenzene, yielding a clear aqueous solution. The pH is adjusted to 2.5 by the addition of concentrated hydrochloric acid and extracted several times with ethyl acetate. These ethyl acetate extracts are washed with water, dried over anhydrous sodium sulfate and evaporated to a residue.

The solid obtained (1 g.) is dissolved in 10 ml. of acetonitrile and 10 ml. of N-hydrochloric acid. This solution is stored in the dark at 37° under nitrogen for 64 hours.

At the end of this time, 20 ml. of water are added to this solution and the solution then extracted five times with 10 ml. portions of ethyl acetate. The residual solution is then brought to pH 6 with 1 N sodium hydroxide, and added to a column of Dowex-1 (x8) (acetate form, 3 cm. x 5 cm.). When all of the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

By substituting 3 - methyl-7-aminodecephalosporanic acid for 7-aminocephalosporanic acid and following the procedure of Example 4, the following compounds are prepared utilizing the appropriate acid chloride:

3 - methyl-7-(2-phenylcyclohex-3-enylcarboxyamido)-de-
cephalosporanic acid.
3 - methyl-7-(6-phenylcyclohex-3-enylcarboxyamido)-de-
cephalosporanic acid.
3 - methyl - 7-(2-phenylcyclohexanylcarboxyamido)-de-
cephalosporanic acid.
3 - methyl-7-(3-phenyl-5-norbornen-2-ylcarboxyamido)-
decephalosporanic acid.
3 - methyl-7-(3-phenylnorbornan-2-ylcarboxyamido)-de-
cephalosporanic acid.

Example 14

One gram of 7-(2-phenylcyclohex-3-enylcarboxyamido)-cephalosporanic acid is dissolved in excess amyl acetate and to this solution is added 10 g. of N-ethylpiperidine. The solution is stirred for 30 minutes and the crystals which form by standing are collected by filtration and dried to yield the N-ethylpiperidine salt of 7-(2-phenylcyclohex-3-enylcarboxyamido)-cephalosporanic acid.

Example 15

One gram of 7-(3-phenyl-5-norbornen-2-ylcarboxyamido)-cephalosporanic acid is dissolved in excess amyl acetate and to this solution 10 g. of triethylamine are added. The solution is stirred for 30 minutes and the crystals which form upon standing are collected by filtration and dried to yield the triethylamine salt of 7-(3-phenyl-5-norbornen-2-ylcarboxyamido)-cephalosporanic acid.

What is claimed is:

1. Compounds of the formula:

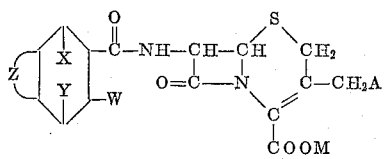

wherein

A is a member selected from the group consisting of hydrogen, hydroxyl, lower alkanoyloxy, benzoyloxy, N-pyridinium, and when taken together with M, a monovalent carbon-oxygen bond;

M is selected from the group consisting of hydrogen, a cation selected from the group consisting of sodium, potassium, calcium, aluminum, lower alkyl amines, procaine, chloroprocaine, N,N'-dibenzylethylenediamine, N,N' - bis-(dehydroabietyl)-ethylenediamine, and N-methyl-1,2-diphenyl-2-hydroxyethylamine, an anionic charge when A is pyridinium and when taken together with A, a monovalent carbon-oxygen bond;

W is selected from the group consisting of hydrogen and phenyl;

X is selected from the group consisting of hydrogen, phenyl and when taken together with Y, a member selected from the group consisting of methylene and 2-propylidene;

Y is selected from the group consisting of hydrogen and when taken together with X, a member selected from the group consisting of methylene and 2-propylidene; and Z is a member of the group consisting of (H, H) and a carbon-carbon bond.

2. A compound of the formula:

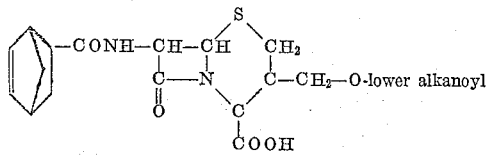

3. A compound of the formula:

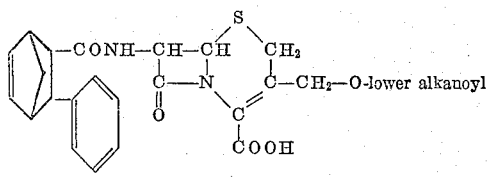

4. 3 - methyl - 7-(5-norbornen-2-ylcarboxyamido)-decephalosporanic acid.

5. 3 - methyl-7-(3-phenyl-5-norbornen-2-ylcarboxyamido)-decephalosporanic acid.

6. 3 - pyridiniummethyl-7-(5-norbornen-2-ylcarboxyamido)-decephalosporanic acid inner salt.

7. 3 - pyridiniummethyl-7-(3-phenyl-5-norbornen-2-ylcarboxyamido)-decephalosporanic acid inner salt.

8. A compound of the formula:

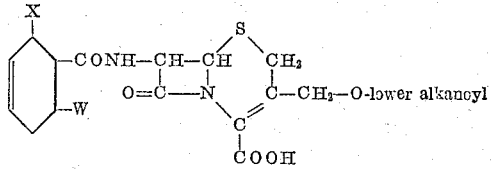

wherein one of X and W is phenyl and the other of X and W is hydrogen.

9. A compound of the formula:

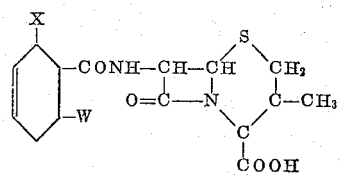

wherein one of X and W is phenyl and the other of X and W is hydrogen.

10. A compound of the formula:

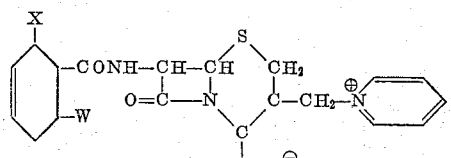

wherein one of X and W is phenyl and the other of X and W is hydrogen.

References Cited in the file of this patent
UNITED STATES PATENTS
2,941,995  Doyle et al. _____ June 21, 1960